US 7,344,188 B2

(12) United States Patent
Sawada et al.

(10) Patent No.: US 7,344,188 B2
(45) Date of Patent: Mar. 18, 2008

(54) SUNROOF DEVICE

(75) Inventors: Kazuki Sawada, Handa (JP); Toshio Iwata, Anjo (JP); Youji Nagashima, Kariya (JP); Kiyozumi Fukami, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 103 days.

(21) Appl. No.: 10/578,269

(22) PCT Filed: Nov. 30, 2004

(86) PCT No.: PCT/JP2004/017816

§ 371 (c)(1),
(2), (4) Date: May 4, 2006

(87) PCT Pub. No.: WO2005/053982

PCT Pub. Date: Jun. 16, 2005

(65) Prior Publication Data

US 2007/0085385 A1     Apr. 19, 2007

(30) Foreign Application Priority Data

Dec. 3, 2003   (JP)   ............................. 2003-404983

(51) Int. Cl.
*B60J 7/185*   (2006.01)
(52) U.S. Cl. .................................. 296/224; 296/216.03
(58) Field of Classification Search ........... 296/216.03, 296/224
See application file for complete search history.

(56) References Cited

U.S. PATENT DOCUMENTS

| 5,630,641 | A | * | 5/1997 | Mori et al. .................. 296/224 |
| 7,252,327 | B2 | * | 8/2007 | Sawada et al. ......... 296/216.03 |
| 2005/0127719 | A1 | * | 6/2005 | Sawada et al. ......... 296/216.03 |

FOREIGN PATENT DOCUMENTS

JP          63-128124 U        8/1988

(Continued)

OTHER PUBLICATIONS

Form PCT/IB/388 dated Aug. 3, 2006 (Notification of Transmittal of Copies of Translation of the International Preliminary Report on Patentability).
Form PCT/IB/373 dated Jul. 27, 2006 (International Preliminary Report on Patentability).

(Continued)

*Primary Examiner*—Dennis H. Pedder
(74) *Attorney, Agent, or Firm*—Buchanan Ingersoll & Rooney PC

(57) ABSTRACT

A sunroof device including a movable panel (13), a functional bracket (24) for supporting the movable panel (13), a guide rail (21), a shoe (30) for moving along the guide rail (21), a check member (31, 32) engageable with the shoe (30), a raising and lowering member (33, 34) for pivotally supporting the check member (31, 32), and an urging member (61) for urging the check member (31, 32). The check member (31, 32) and the shoe (30) are set in one of an engaged state, in which they are moved integrally, and a disengaged state, in which they are separated. The raising and lowering member moves the functional bracket upward or downward in cooperation with movement of the check member (31, 32) in the engaged state. The urging member (61) turns over the check member (31, 32) with an urging force to set the check member in the disengaged state.

6 Claims, 9 Drawing Sheets

FOREIGN PATENT DOCUMENTS

| | | |
|---|---|---|
| JP | 3-169740 A | 7/1991 |
| JP | 3-73487 B2 | 11/1991 |
| JP | 6-78038 U | 11/1994 |
| JP | 7-40232 U | 7/1995 |
| JP | 2000-108676 A | 4/2000 |
| JP | 2001-039162 A | 2/2001 |

OTHER PUBLICATIONS

Form PCT/ISA/237 (Written Opinion of the International Searching Authority), no date provided.
International Search Report dated Mar. 15, 2005.

* cited by examiner

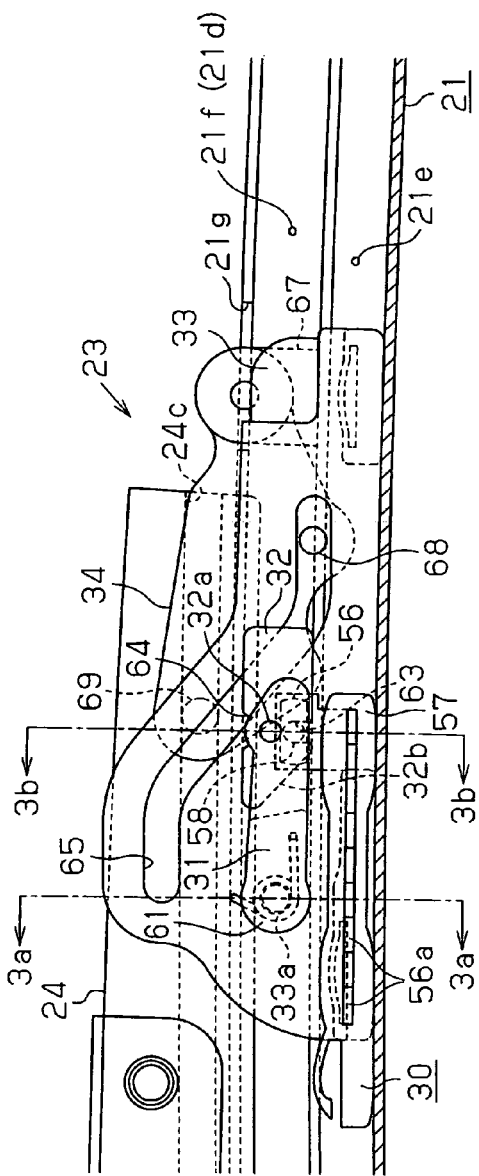 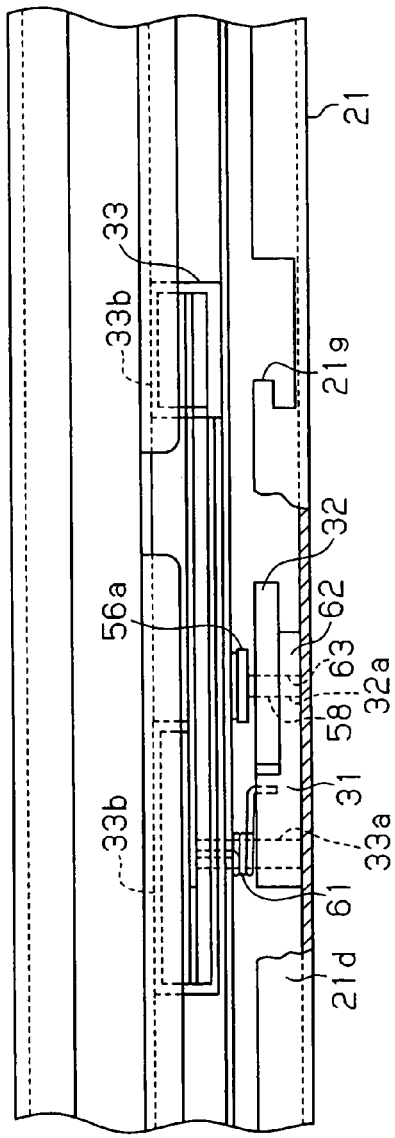
Fig.2(a)
Fig.2(b)

SUNROOF DEVICE

FIELD OF THE INVENTION

The present invention relates to a sunroof device installed on a roof of a vehicle.

BACKGROUND OF THE INVENTION

Examples of sunroof devices known in the prior art are described in Patent Publications 1 to 3. Such a sunroof device includes a check block for restricting movement of a movable panel (timing arms 21 and 29 in patent publication 1, lever 94 in patent publication 2, and timing arm 29 in patent publication 3).

In a conventional sunroof device, movement of the movable panel is restricted by pivoting the check block, which is pivotally supported by a pin or the like. When, for example, the check block is short as in patent publications 1 and 2, the rotation state of the check block is apt to be canceled. More specifically, a member such as a guide rail may apply an external force for canceling the pivoting state of the check block. The check block, which is short in the longitudinal direction, easily swings when subjected to the above external force. As a result, the state of the movable panel becomes unstable. To prevent such swinging of the check block, special measures must be taken to maintain the pivoting state of the check block against a predicted external force.

Patent Publication 1: Japanese Laid-Open Utility Model Publication No. 6-78038 (FIGS. 1 and 9)
Patent Publication 2: Japanese Examined Patent Publication No. 3-73487 (FIG. 17)
Patent Publication 3: Japanese Laid-Open Patent Publication No. 3-169740 (FIG. 1)

SUMMARY OF THE INVENTION

The present invention provides a sunroof device in which a movable panel is held in a stable state.

A first aspect of the present invention is a sunroof device including a movable panel for closing a roof opening of a vehicle, a functional bracket for supporting the movable panel, and a guide rail arranged in the roof opening. The guide rail extends from a front side to a rear side of the vehicle. A shoe moves along the guide rail. A check member is engageable with the shoe. The check member and the shoe are set in one of an engaged state and a disengaged state. The check member moves integrally with the shoe as the shoe moves in the engaged state. The check member and the shoe are separated from each other and the check member is engaged with the guide rail in the disengaged state. A raising and lowering member pivotally supports the check member. The raising and lowering member moves the functional bracket upward or downward in cooperation with movement of the check member in the engaged state. An urging member applies an urging force to the check member. The urging member turns over the check member with the urging force. The sun roof device is characterized in that the check member is turned over and set in the disengaged state.

With the first aspect of the present invention, the check member is turned over by the action of the urging member to enter the disengaged state. That is, the check member is pivoted by the urging force of the urging member and maintained in the engaged state and the disengaged state by the urging force of the urging member. Thus, unexpected shifting between the engaged state and the disengaged state does not easily occur. Accordingly, the disengaged state is stably maintained. This enables the check member to stably hold the functional bracket at a stable position and consequently hold the movable panel in a stable state.

Further, the shoe includes a shoe side engagement portion. The check member includes a first check block, pivotally supported by the raising and lowering member, and a second check block, pivotally supported by the first check block and having a check side engagement portion. In the engaged state, pivoting of the check member is restricted by the guide rail, and the shoe side engagement portion and the check side engagement portion are engaged with each other. In the disengaged state, pivoting of the second check block is permitted, and the shoe side engagement portion presses the check side engagement portion and swings the first check block as the shoe moves so that the second check block is rotated and locked to the guide rail.

In this state, the urging member is arranged between the guide rail and the first check block and presses a pivoting axis of the second check block toward the guide rail so that the second check block is locked to the guide rail.

A second aspect of the present invention is a sunroof device including a movable panel for closing a roof opening of a vehicle, a functional bracket for supporting the movable panel, and a guide rail arranged in the roof opening. The guide rail extends from a front side to a rear side of the vehicle. A shoe moves along the guide rail. A check member is engageable with the shoe. The check member and the shoe are set in one of an engaged state and a disengaged state, the check member moves integrally with the shoe as the shoe moves in the engaged state. The check member and the shoe are separated from each other and the check member is engaged with the guide rail in the disengaged state. A raising and lowering member pivotally supporting the check member. The raising and lowering member moves the functional bracket upward or downward in cooperation with movement of the check member in the engaged state. The sun roof device is characterized in that the check member moves in a direction differing from a direction in which the check member pivots relative to the raising and lowering member so that the check member is set in the disengaged state.

With the second aspect of the present invention, the check member enters the disengaged state when displaced in a direction differing from the pivoting direction relative to the raising and powering member. Thus, to shift between the engaged state and the disengaged state, the external force in the above two or more different directions must simultaneously be applied to the check member. However, the possibility of such plural external forces being simultaneously applied to the check member in an unexpected manner is extremely small. Accordingly, the disengaged state is stably maintained. This enables the check member to be held at a stable position and consequently hold the movable panel in a stable state.

Further, the sunroof includes a guide block fixed to the guide rail. The guide block includes a guide groove extending along the guide rail. The guide groove includes an end portion having a lock recession. An urging member applies an urging force to the check member. The urging member urges the check member toward the guide groove with the urging force. The shoe has a shoe side engagement portion. The check member includes a first engagement portion and a second engagement portion. In the engaged state, pivoting of the check member is restricted by the guide rail, and the shoe side engagement portion and the first engagement portion are engaged with each other. In the disengaged state, pivoting of the check member is permitted, and the second engagement portion is guided by the guide groove as the shoe moves so that the check member is pivoted, and the urging force of the urging member inserts the second engagement portion in the lock recession.

In this state, the guide groove guides the second engagement portion to pivot the check member and insert the second engagement portion in the lock recession with the urging force of the urging member so that the check member and the shoe enter the disengaged state. Accordingly, even when receiving external force that would cancel a disengaged state from the guide rail, the second engagement portion is fitted in the lock recession by the urging force of the urging member. Thus, the disengaged state of the check member and the shoe is not easily canceled.

Further, the shoe and the check member each have a guide surface, and the guide surfaces slide as the shoe and the check member move relative to each other and gradually insert the second engagement portion in the lock recession.

In this state, when shifting from the engaged state to the disengaged state, the two guide surfaces slide and move relative to each other so that the second engagement portion is gradually inserted in the lock recession. This gradually shifts the engaged state to the disengaged state. As a result, abnormal noise is prevented from being produced. This is the same for the shifting from the disengaged state to the engaged state.

BRIEF DESCRIPTION OF THE DRAWINGS

FIG. 2(a) is a side view showing a rear mechanism, and FIG. 2(b) is a plan view showing the rear mechanism;

DETAILED DESCRIPTION OF THE PREFERRED EMBODIMENTS

First Embodiment

A sunroof device according to a first embodiment of the present invention will now be described with reference to the drawings.

Figure 6A:
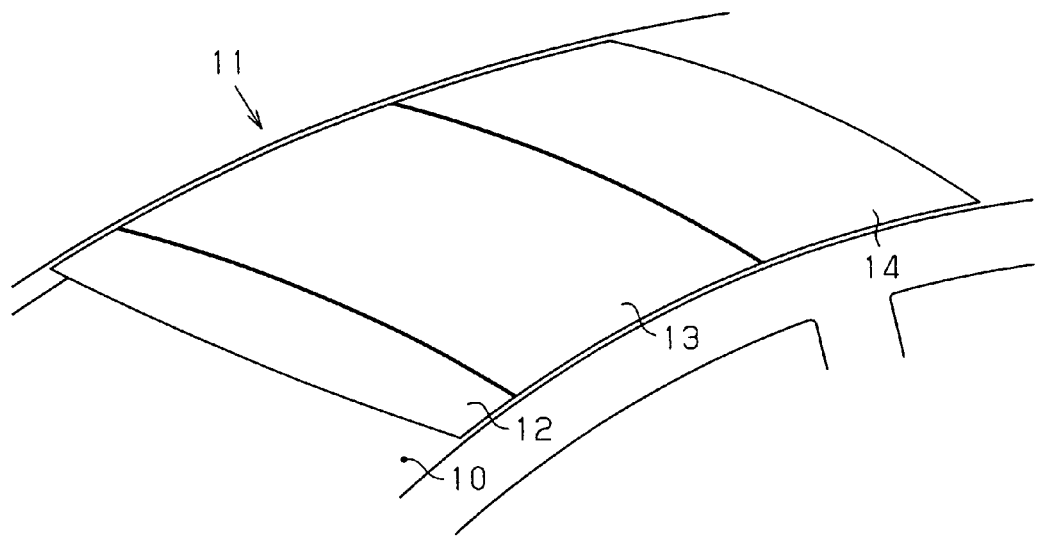
FIGS. 6(a) and 6(b) are perspective views respectively showing a closed state and a fully-open state for a roof opening.
Figure 6B:
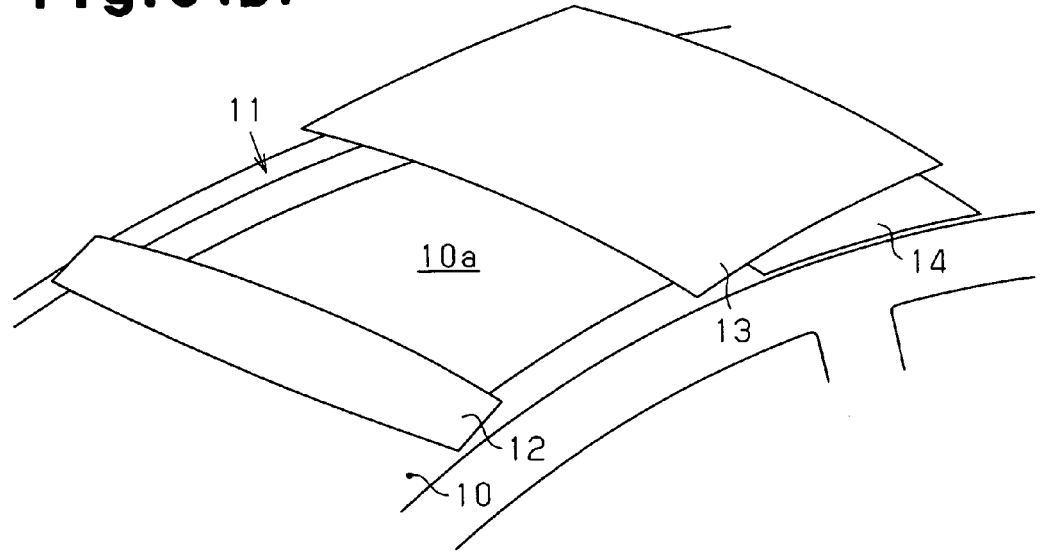

FIGS. 6(a) and 6(b) are perspective views showing a sunroof device 11, which is installed in a roof 10 of a vehicle, such as an automobile. FIGS. 6(a) and 6(b) respectively show a closed state and a fully-open state for the roof opening 10a of the sunroof device 11.

As shown in the drawings, the roof opening 10a is formed in the roof 10. A deflector panel 12, a movable panel 13, and a fixed panel 14 are arranged at the roof opening 10a in this order from the front side to the rear side of the vehicle. The deflector panel 12, the movable panel 13, and the fixed panel 14 are formed, for example, by glass plates that transmit light and completely close the roof 10 of the vehicle in the closed state.

Figure 1A:
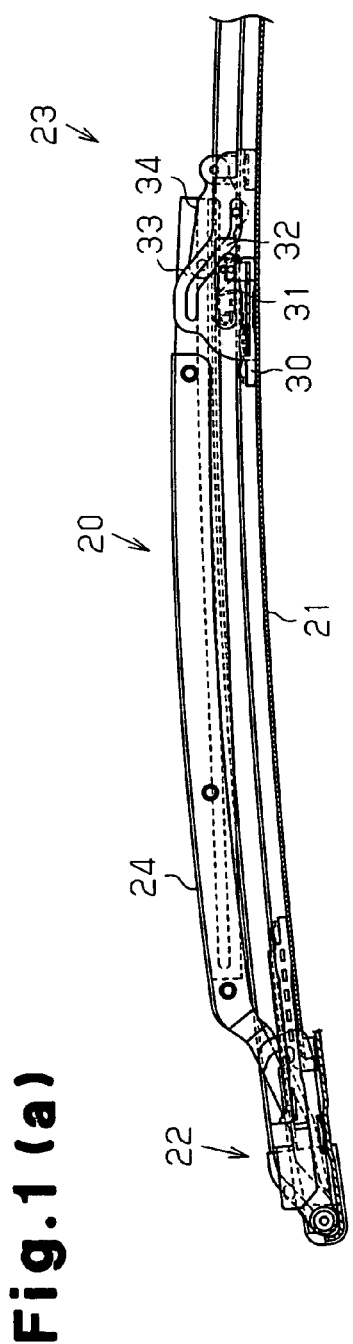
FIGS. 1(a) to 1(c) are side views showing a mechanism according to a first embodiment of the present invention.
Figure 1B:
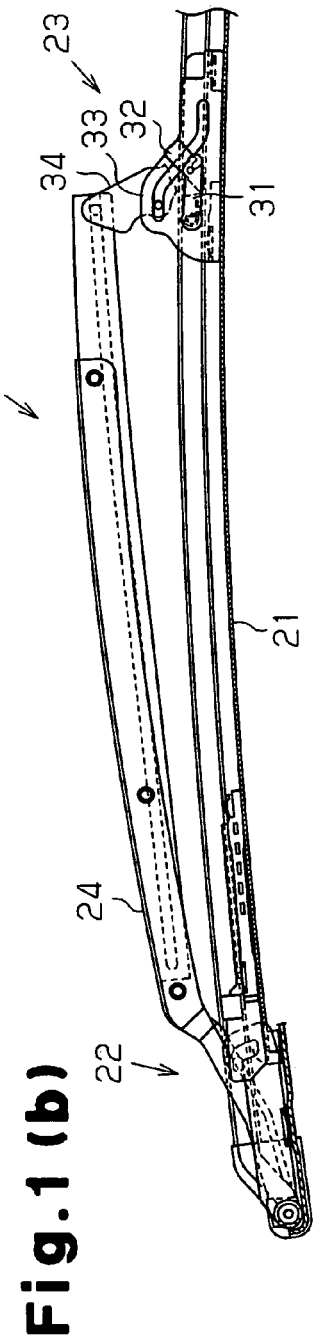
Figure 1C:
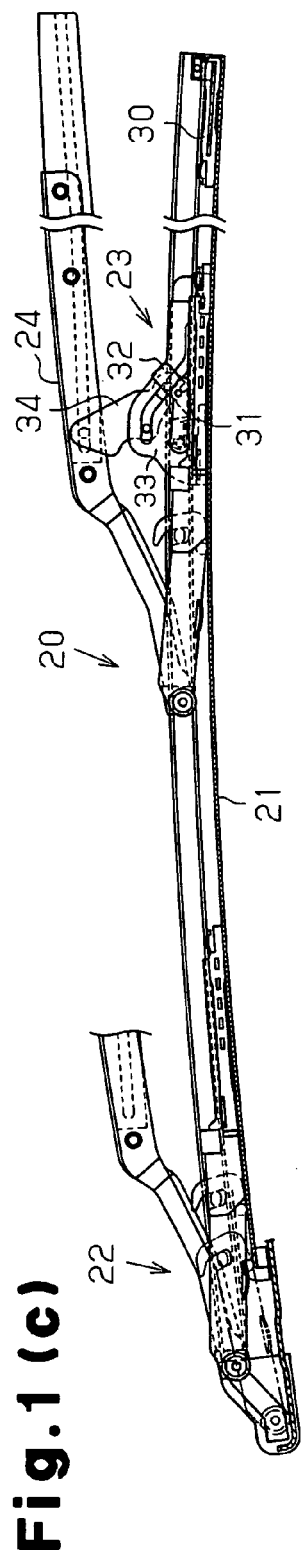

The deflector panel 12 is installed on the roof 10 in a manner that the deflector panel 12 performs a tilt-up operation for pivoting its front part so as to move its rear part upward. The deflector panel 12 performs the tilt-up operation when the movable panel 13 moves to the rear side of the vehicle. The movable panel 13 is installed on the roof 10. The movable panel 13 performs a tilt-up operation and is lifted above the roof 10 as shown in FIG. 1(b). In addition, the movable panel 13 slides to the front side and the rear side of the vehicle as shown in FIG. 1(c). The present embodiment employs an outer slide method for performing a slide operation when the movable panel 13 is lifted above the roof 10 through the tilt-up operation, that is, while the movable panel 13 is in a tilt-up state. The fixed panel 14 is fixed to the roof 10 and closes a rear part of the roof opening 10a.

Next, a mechanism for opening and closing the roof opening 10a by moving the movable panel 13 will be described. FIG. 1(a) is a side view showing a mechanism 20 of the sunroof device 11. The sunroof device 11 includes a pair of mechanisms 20 arranged on the two sides of the roof 10. The two mechanisms 20, which are arranged at the both sides of the roof opening 10a, have identical structures except in that they are symmetric with respect to the central axis that extends in the forward driving direction of the vehicle. FIGS. 1(a) to 1(c) are side views of the mechanism 20 that is arranged at the right side of the vehicle as viewed from the left side (the inside of the vehicle). Accordingly, the left side of the drawings corresponds to the front side of the vehicle, and the right side of the drawings corresponds to the rear side of the vehicle. FIGS. 1(a) to 1(c) show the state of the mechanism 20 in different stages of movement of the movable panel 13 to the rear side of the vehicle. FIG. 1(a) corresponds to the closed state of the opening 10a. FIG. 1(b) corresponds to the tilt-up state of the movable panel 13. FIG. 1(c) corresponds to the fully-open state of the roof opening 10a.

As shown in FIG. 1(a), the mechanism 20 includes a guide rail 21, which extends from the front side to the rear side of the vehicle, a front mechanism 22, which is located at the front side of the guide rail 21, a rear mechanism 23, which is located at the rear side of the guide rail 21, and a functional bracket 24, of which operation is determined by the front mechanism 22 and the rear mechanism 23. The guide rail 21 is arranged at a left side of the mechanism 20, that is, at a position close to the roof opening 10a. The functional bracket 24 is attached to the movable panel 13 (structure for attaching the movable panel 13 to the functional bracket 24 is not shown). As shown in FIGS. 2(a) and 2(b), the rear mechanism 23 includes a rear shoe 30, a first check block 31, a second check block 32, a raising and lowering guide 33, and a raising and lowering link 34.

Figure 3A:
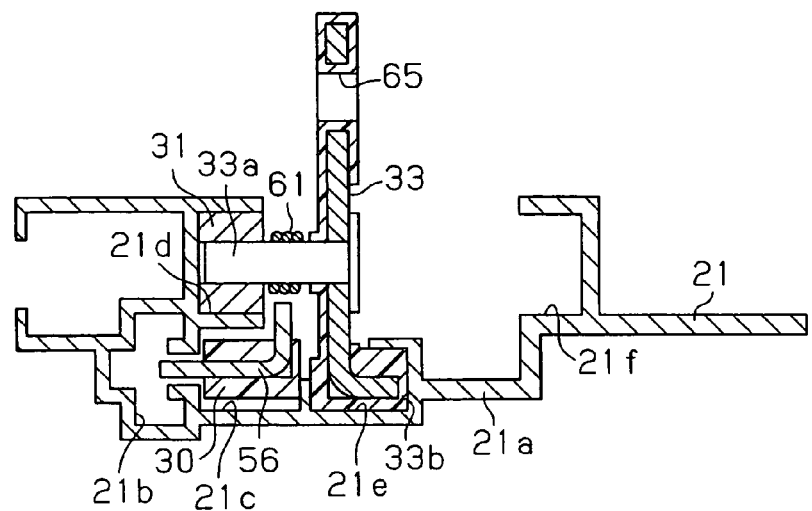
FIG. 3(a) is a cross-sectional view taken along line 3a-3a in FIG. 2(a)
Figure 3B:
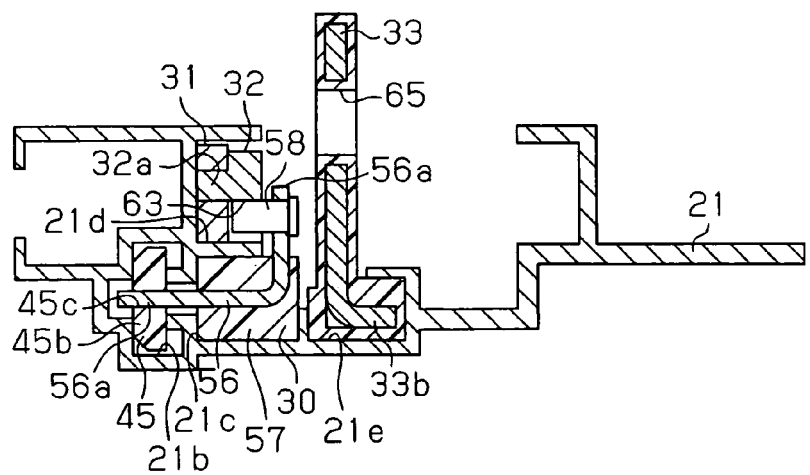
FIG. 3(b) is a cross-sectional view taken along line 3b-3b in FIG. 2(a)

The guide rail 21 accommodates the front mechanism 22 and the rear mechanism 23. The guide rail 21 has substantially identical cross-sections as shown in FIGS. 3(a) and 3(b) in its longitudinal direction. The guide rail 21 includes a plate 21a, which is arranged at a middle position with respect to the widthwise direction, a belt guide 21b, which is formed at the left side of the plate 21a (at the inner side of the vehicle), a first guide 21c, a second guide 21d, and a third guide 21e. The belt guide 21b is arranged at the leftmost part of the guide rail 21. The first guide 21c is arranged at the right side of the belt guide 21b, and the second guide 21d is arranged above the first guide 21c. The third guide 21e is arranged at the right side of the first guide 21c. The guide rail 21 includes a fourth guide 21f at the right side of the plate 21a (the outer side of the vehicle). The upper wall of the second guide 21d has a notch 21g, which is formed in the vicinity of the raising and lowering link 34 as shown in FIGS. 2(a) and 2(b).

As shown in FIG. 3(b), a drive belt 45, which is connected to an output pulley of a drive motor that is not shown in the drawings, is inserted in the belt guide 21b. FIG. 3(a) does not show the drive belt 45 for the sake of convenience. The drive belt 45 is made of resin, and has a plurality of teeth 45b. The drive belt 45 has a plurality of mounting holes 45c at positions corresponding to the front mechanism 22 and the rear mechanism 23 (a rear shoe 30) for holding the front mechanism 22 and the rear mechanism 23. The drive belt 45 is inserted in the belt guide 21b with its teeth 45b arranged at the left side (the side facing the first guide 21c), and is movable in the longitudinal direction of the belt guide 21b. The right edge of each mounting hole 45c opens toward an opening having a reduced diameter and located at the left side of the first guide 21c.

The front mechanism 22 is connected to the drive belt 45. As shown in FIGS. 1(a) to 1(c), the front mechanism 22 pivotally supports the front part of the functional bracket 24. The front mechanism 22 does not move the front part of the functional bracket 24 before the rear part of the functional bracket 24 is completely raised irrespective of movement of the drive belt 45. When the rear part of the functional bracket 24 is completely raised, the front mechanism 22 moves the front part of the functional bracket 24 to the front side or the rear side of the vehicle in cooperation with the movement of the drive belt 45. In this way, in the sunroof device 11 of the present embodiment, the movable panel 13 that is supported by the functional bracket 24 moves to the rear side of the vehicle and opens the roof opening 10a after the movable panel 13 shifts to the tilt-up state. When the roof opening 10a is to be closed from the fully-open state, the front part of the functional bracket 24 is first moved to the front side of the vehicle so as to complete the shift to the tilt-up state. Afterwards, the rear part of the movable panel 13 is lowered.

The rear shoe 30 is inserted in the first guide 21c of the guide rail 21 in a manner that the rear shoe 30 is slidable to the front side and the rear side of the vehicle. As shown in FIG. 2(a) and FIGS. 3(a) and 3(b), the rear shoe 30 includes a frame 56, which forms the frame of the rear shoe 30, a guide shoe 57, which is made of resin and in which the frame 56 is embedded, and an engagement pin 58, which functions as a shoe side engagement portion. The engagement pin 58 is arranged at the rear side of the rear shoe 30.

As shown in FIG. 3(b), the rear shoe 30 is supported on the top surface of the first guide 21c by the guide shoe 57. The frame 56 has a plurality of mounting pieces 56a that are inserted in the mounting holes 45c of the drive belt 45. The rear shoe 30 is connected to the drive belt 45 by inserting the mounting pieces 56a in the mounting holes 45c. Thus, the rear shoe 30 moves on the first guide 21c in cooperation with the movement of the drive belt 45.

As shown in FIG. 2(a) and FIG. 3(b), the engagement pin 58 is arranged on the upper end portion of the frame 56 that projects upward from the rear end portion of the guide shoe 57. The upper end part of the frame 56 and the engagement pin 58 are both arranged above an opening formed in the right upper portion of the first guide 21c as shown in FIG. 3(b). The distal portion of the engagement pin 58 projects into the lower portion of the second guide 21d. The engagement pin 58 is located at a position that is lower than the middle position of the second guide 21d in the heightwise direction.

As shown in FIGS. 2(a) and 2(b) and FIGS. 3(a) and 3(b), the first check block 31 is pivotally supported on the raising and lowering guide 33 by a pin 33a. The pin 33a projects from the side surface of the raising and lowering guide 33 to the left side (the side of the second guide 21d), and its distal portion pivotally supports the first check block 31 that is arranged in the second guide 21d. The pin 33a is inserted in a hole that is formed at a middle position of the first check block 31 in the heightwise direction. The first check block 31 is supported by the second guide 21d, and is formed to have a height equal to the height of the second guide 21d. The first check block 31 extends from the pin 33a to the rear side of the vehicle along the second guide 21d. The rear part of the first check block 31 is urged downward (to the bottom wall side of the second guide 21d) by a spring 61, which is set on the pin 33a.

As shown in FIG. 2(b), a reduced-width portion 62 is formed on the distal portion of the first check block 31. The reduced-width portion 62 is thin and formed by cutting the right side of the distal portion of the first check block 31 (the open side of the second guide 21d). The second check block 32 is pivotally supported on the reduced-width portion 62. The second check block 32 is arranged in the second guide 21d together with the first check block 31. A cylindrical rod 32a, which projects to the left side (the side of the reduced-width portion 62), is arranged at a middle position of the second check block 32 in the longitudinal direction. The second check block 32 is pivotally supported on the first check block 31 by inserting the rod 32a in a circular hole that is formed in the reduced-width portion 62. Thus, the first and second check blocks 31 and 32 are both arranged in the second guide 21d parallel to each other in the widthwise direction.

The rod 32a, which functions as a pivot axis for the second check block 32, is higher than the middle position of the second guide 21d in the heightwise direction. The second check block 32 has an engagement groove 63, which functions as a check side engagement portion and which is formed by recessing the lower surface of the rod 32a. The second check block 32 has a lock groove 64, which is formed by recessing the upper surface of the rod 32a. A contact surface 32b, which is inclined in a manner that it is higher toward the front side of the vehicle, is formed on the front end portion of the second check block 32.

When the second check block 32 is arranged along the second guide 21d (that is, when the guide rail 21 restricts pivoting of the second check block 32), the engagement groove 63 is engaged with the engagement pin 58 of the rear shoe 30. In this state, when the rear shoe 30 moves to the front side or the rear side, the second check block 32 moves on the second guide 21d integrally with the first check block 31 and the raising and lowering guide 33 (an engaged state of the first and second check blocks 31 and 32 and the rear shoe 30). Accordingly, the first and second check blocks 31 and 32, of which movement in the heightwise direction is restricted by the top wall and the bottom wall of the second guide 21d, do not pivot. Further, in this engaged state, an urging force applied by the spring 61 via the first check block 31 causes the lower end of the second check block 32 to be in contact with the bottom surface of the second guide 21d.

The engagement pin 58 is arranged at a location lower than the middle position of the second guide 21d in the heightwise direction as described above. Thus, the engagement pin 58 is arranged below the rod 32a in engagement with the engagement groove 63. In the engaged state shown in FIGS. 2(a) and 2(b) and FIGS. 3(a) and 3(b), when the rear shoe 30 is moved to the rear side, the engagement pin 58 applies a first rotating force for causing the second check block 32 to rotate counterclockwise as viewed in the drawing. Accordingly, the rod 32a applies a second rotating force for causing the first check block 31 to rotate in the same direction.

Figure 4:
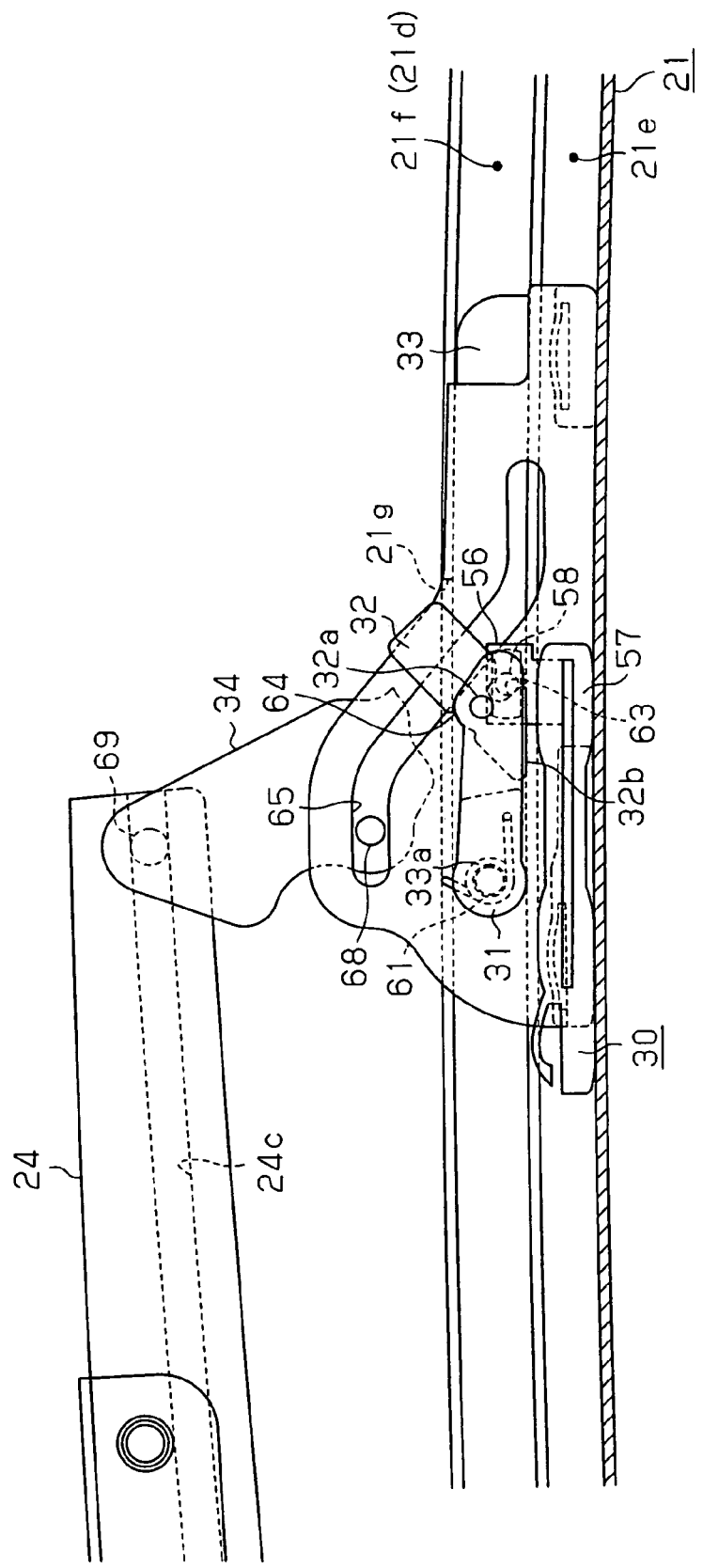
FIG. 4 is a side view showing the operation of the rear mechanism.

In the tilt-up state shown in FIG. 4, when the rear shoe 30 moves to the rear side, the second check block 32 moves to the rear side along the second guide 21d and reaches a position under the notch 21g. In this state, the rear part of the second check block 32 is upwardly pivotal. As a result, the above first rotating force pivots the second check block 32 to rotate until the contact surface 32b comes in contact with the bottom surface of the second guide 21d in cooperation with the counterclockwise swinging of the first check block 31 that is caused by the second rotating force.

Figure 5:
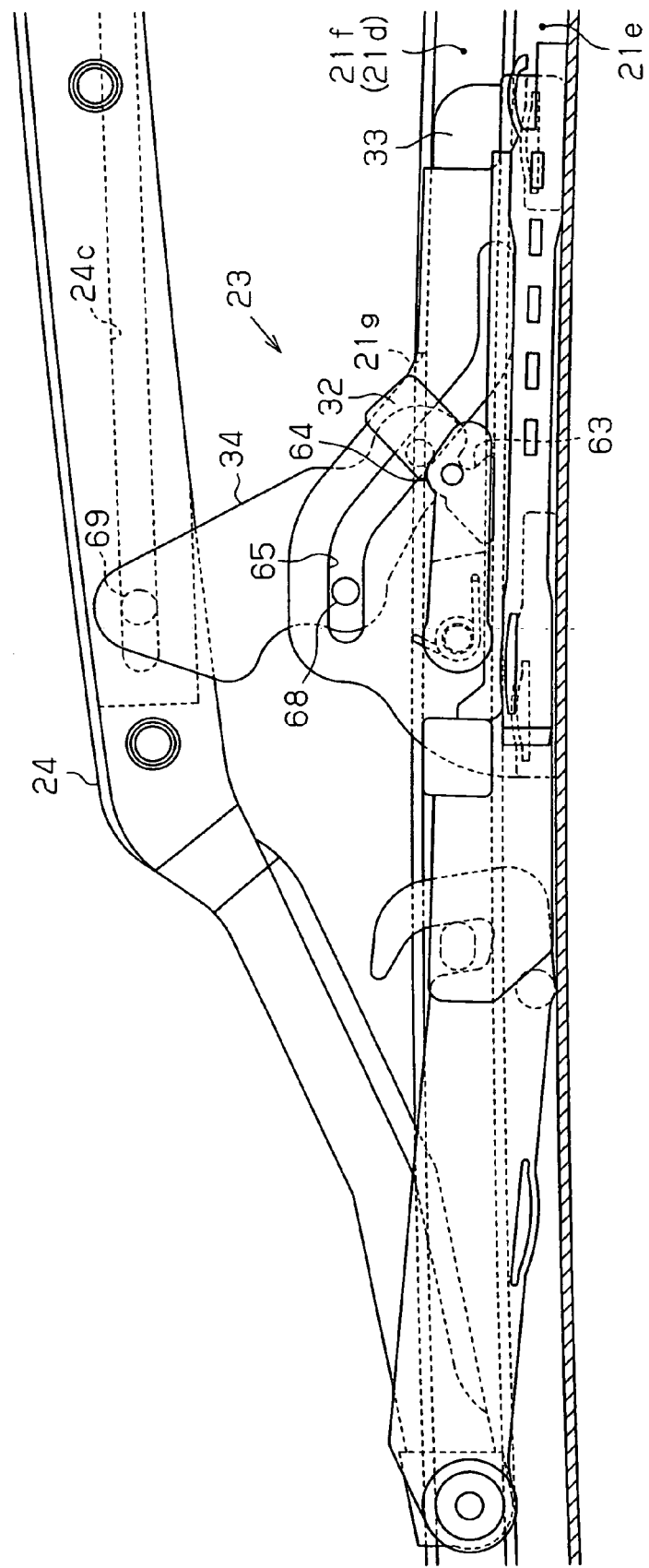
FIG. 5 is a side view showing the operation of the rear mechanism.

Next, as shown in FIG. 5, the pivoting of the second check block 32 locks the lock groove 64 of the second check block 32 at the front side of the notch 21g. At the same time, the engagement pin 58 is removed from the engagement groove 63 so that the engaged state of the engagement pin 58 and the engagement groove 63 is canceled (disengaged state of the first and second check blocks 31 and 32 and the rear shoe 30). As a result, the urging force applied by the spring 61 via the first check block 31 causes the second check block 32 to be held in a state in which its lock groove 64 is locked at the front distal end of the notch 21g. In this state, the second check block 32 is urged in a state in which the contact surface 32b is in contact with the bottom surface of the second guide 21d. Afterwards, the rear shoe 30 is separated from the second check block 32, and moves solely to the rear side. The second check block 32 stops moving in the vicinity of the notch 21g together with the first check block 31 and the raising and lowering guide 33.

More specifically, the second check block 32 is arranged at two selective pivoting angles in accordance with the switching between the engaged state and the disengaged state. In either one of the engaged state and the disengaged state, the second check block 32 is held stably in a state contacting the bottom surface of the second guide 21d and urged by the spring 61. In other words, the second check block 32 is turned over by the action of the spring 61 so that the second check block 32 is set in one of the engaged state and the disengaged state.

When the rear shoe 30 that has been moved to the rear side is moved to the front side, the engagement pin 58 presses the engagement groove 63 to the front side. As a result, the second check block 32 rotates clockwise as viewed in the drawing in cooperation with the swinging of the first check block 31 until its bottom end surface comes in contact with the bottom surface of the second guide 21d. Thus, the engaged state of the lock groove 64 of the second check block 32 and the front side of the notch 21g is cancelled.

Here, in the engaged state of the lock groove 64 and the notch 21g shown in FIG. 4 and FIG. 5 (that is, the disengaged state of the first and second check blocks 31 and 32 and the rear shoe 30), external force such as that produced when pressing the raising and lowering guide 33 to the front side (canceling the engaged state of the lock groove 64 and the notch 21g) is assumed to be applied. In this case, the second check block 32, which has been turned over by the action of the spring 61, does not rotate in either direction. Thus, the lock groove 64 and the notch 21g remain in the engaged state.

As described above, the raising and lowering guide 33 includes the pin 33a, a guide shoe 33b, and a guide hole 65, and is arranged at the right of the rear shoe 30 and the first and second check blocks 31 and 32. As shown in FIG. 3(b), the raising and lowering guide 33 is supported on the third guide 21e via the guide shoe 33b and is connected to the first check block 31 by the pin 33a. When the rear shoe 30 and the second check block 32 are in the engaged state, the raising and lowering guide 33 moves on the third guide 21e in cooperation with the movement of the rear shoe 30.

As shown in FIG. 2(a) and FIG. 4, the raising and lowering guide 33 includes the guide hole 65 that extends diagonally downward from the front side to the rear side of the vehicle. The raising and lowering guide 33 is engaged with the above raising and lowering link 34 via the guide hole 65. Thus, the raising and lowering link 34 moves upward or downward in cooperation with the movement of the raising and lowering guide 33.

As shown in FIG. 2(a), a bracket 67 is fixed to the plate 21a of the guide rail 21 located in the vicinity of the notch 21g. The raising and lowering link 34 is arranged to extend to the front side of the vehicle in a state pivotally supported by the bracket 67. At a position frontward from the pivoting axis of the raising and lowering link 34, a guide pin 68, which is inserted through the guide hole 65, is formed to extend to the left side of the vehicle. In the closed state of the roof opening 10a, the guide pin 68 is arranged at the rear side of the guide hole 65. In this state, when the raising and lowering guide 33 moves to the rear, the raising and lowering guide 33 moves the guide pin 68 upward along the guide hole 65, so that the raising and lowering guide 33 rotates the raising and lowering link 34 clockwise as viewed in the drawing to upwardly press the distal end of the raising and lowering link 34 as shown in FIG. 4. In the tilt-up state shown in FIG. 4, the guide pin 68 that has been moved upward along the guide hole 65 is at the front distal end of the guide hole 65, which is located at the highest position of the guide hole 65.

An engagement pin 69 for supporting the functional bracket 24 is arranged on the distal portion of the raising and lowering link 34. More specifically, a guide groove 24c, which extends in the longitudinal direction (from the front side to the rear side of the vehicle), is formed on the outer surface of the functional bracket 24. The engagement pin 69 of the raising and lowering link 34 is inserted in the guide groove 24c. Thus, the functional bracket 24 is supported on the raising and lowering link 34 by the engagement pin 69. When the raising and lowering link 34 is rotated and pressed upward, the rear part of the functional bracket 24 is accordingly pressed upward. As a result, the movable panel 13 is set in the tilt-up state. Each component operates in the sequence opposite to the sequence described above when the rear shoe 30 that has been moved to the rear side is moved back to the front side of the vehicle.

In a state in which the raising and lowering link 34 is pressed upward, the guide groove 24c, in which the engagement pin 69 is inserted, extends in the longitudinal direction of the functional bracket 24. Thus, the functional bracket 24 is movable to the rear side of the vehicle while being guided along the guide groove 24c via the engagement pin 69. As shown in FIG. 5, when the movement of the functional bracket 24 is completed, the roof opening 10a is in the fully-open state. In this state, the functional bracket 24 is moved to the rear side until the engagement pin 69 is locked at the front distal end of the guide groove 24c. Each member operates in a sequence opposite to the sequence described above when a front shoe (not shown) is moved back to the front side of the vehicle.

Next, the overall operation of the sunroof device 11 with the above-described structure will be described. When the drive belt 45 is driven and moved to the rear side from the closed state of the roof opening 10a, which is closed by the movable panel 13, the rear shoe 30, which is connected to the drive belt 45, is moved to the rear side together with the drive belt 45. The movement of the rear shoe 30 to the rear side causes the second check block 32, which is engaged with the engagement pin 58, to move to the rear side together with the first check block 31 and the raising and lowering guide 33. The movement of the raising and lowering guide 33 to the rear side causes the guide pin 68 of the raising and lowering link 34, which is inserted through the guide hole 65, to be pressed upward along the guide hole 65. As a result, the raising and lowering link 34 rotates to move its distal end upward.

When the movement of the rear shoe 30 to the rear side causes the second check block 32 to reach a location under the notch 21g, the second check block 32 becomes upwardly pivotal. In this case, the second check block 32 is pressed to the rear side by the engagement pin 58. Thus, the second check block 32 pivots in cooperation with the counterclockwise swinging of the first check block 31 until its contact surface 32b comes in contact with the bottom surface of the second guide 21d. Then, the second check block 32 is pivoted so that the lock groove 64 of the second check block 32 is locked at the front side of the notch 21g. At the same time, the engagement pin 58 is removed from the engagement groove 63 so that the engaged state of the two members is cancelled. As a result, the second check block 32 is held in a state in which its lock groove 64 is locked at the front distal end of the notch 21g by the urging force of the spring 61 that is applied by the first check block 31. This completes the tilt-up operation of the movable panel 13 for moving the rear part of the functional bracket 24 upward.

When the tilt-up operation is completed, the rear shoe 30 and the second check block 32 are separated from each other so that the rear shoe 30 moves the first guide 21c to the rear side. The movable panel 13 supported by the functional bracket 24 moves to the rear side of the vehicle only after the front mechanism 22 shifts the movable panel 13 to the tilt-up state.

The present embodiment has the advantages described below.

(1) The second check block 32 is turned over by the action of the spring 61 so that the first and second check blocks 31 and 32 and the rear shoe 30 are set in the disengaged state. Thus, the second check block 32 of the present embodiment is pivoted by the urging force applied by the spring 61 and maintained in the engaged state and disengaged state by the urging force of the spring 61. Thus, unexpected shifting between the engaged state and the disengaged state is less likely to occur. This enables the disengaged state of the first and second check blocks 31 and 32 and the rear shoe 30 to be maintained in a stable manner. As a result, the first and second check blocks 31 and 32 enable the functional bracket 24 to be held at a stable position. In other words, the first and second check blocks 31 and 32 enable the movable panel 13 to be held in a stable state.

(2) The second check block 32, of which the pivot axis differs from the pivot axis of the raising and lowering guide 33 (the pivot axis of the first check block 31), is pivoted and locked at the guide rail 21 so that the first and second check blocks 31 and 32 and the rear shoe 30 are set in the disengaged state. Thus, even when an external force for canceling the above disengaged state is applied from the guide rail 21, the check member, which is formed by the first and second check blocks 31 and 32, has separate pivot axes so as to disperse the external force. As a result, the disengaged state is easily maintained. The first and second check blocks 31 and 32 enable the functional bracket 24 to be held at a stable position and enable the movable panel 13 to be held in a stable state.

(3) The urging force of the spring 61 maintains the engaged state of the lock groove 64 of the second check block 32 and the notch 21g of the guide rail 21 more easily. This enables the disengaged state of the first and second check blocks 31 and 32 and the rear shoe 30 to be maintained more stably.

Second Embodiment

A second embodiment of the present invention will now be described with reference to the drawings. Only the structure of the rear mechanism 23 of the first embodiment is changed in the second embodiment. The components in the second embodiment that perform the same operations as the components in the first embodiment are given the same reference numerals as those components and will not be described in detail.

Figure 7A:
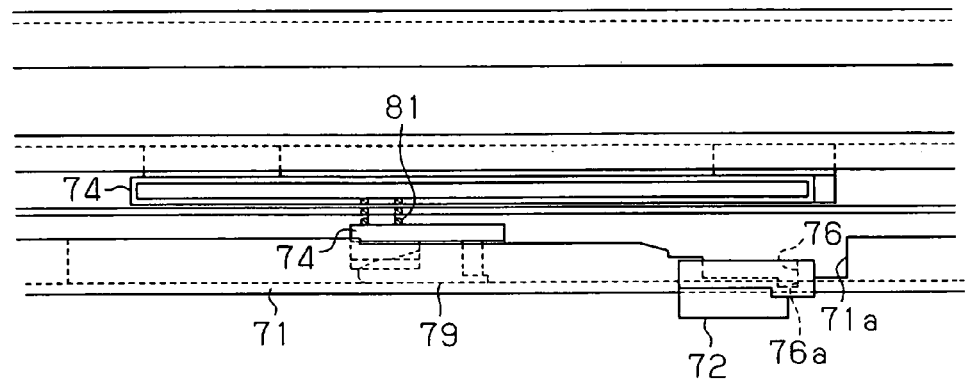
FIG. 7(a) is a plan view showing a rear mechanism according to a second embodiment of the present invention.
Figure 7B:
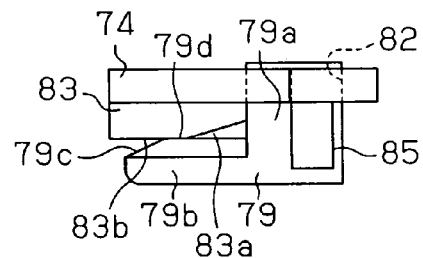
FIG. 7(b) is a plan view showing an engagement portion and a lock portion.
Figure 7C:
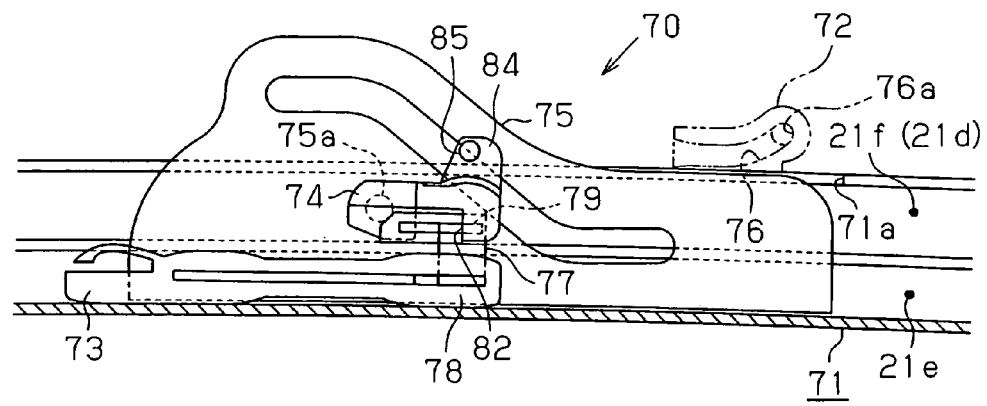
FIG. 7(c) is a side view showing the rear mechanism.

FIGS. 7(a) and 7(b) are plan views showing a rear mechanism 70 for setting a movable panel 13 in a tilt-up state. FIG. 7(c) is a side view showing the rear mechanism 70 and a guide rail 71. FIG. 7(c) is a side view showing the rear mechanism 70 that is arranged on the right side of the vehicle as viewed from the left side (the inside of the vehicle). Accordingly, the left side in the drawing corresponds to the front side of the vehicle, and the right side in the drawing corresponds to the rear side of the vehicle. As shown in the drawings, the rear mechanism 70 of the present embodiment includes a guide block 72, a rear shoe 73, a check block 74, a raising and lowering guide 75, and the raising and lowering link 34 of the first embodiment (the raising and lowering link 34 is not shown).

Figure 9:
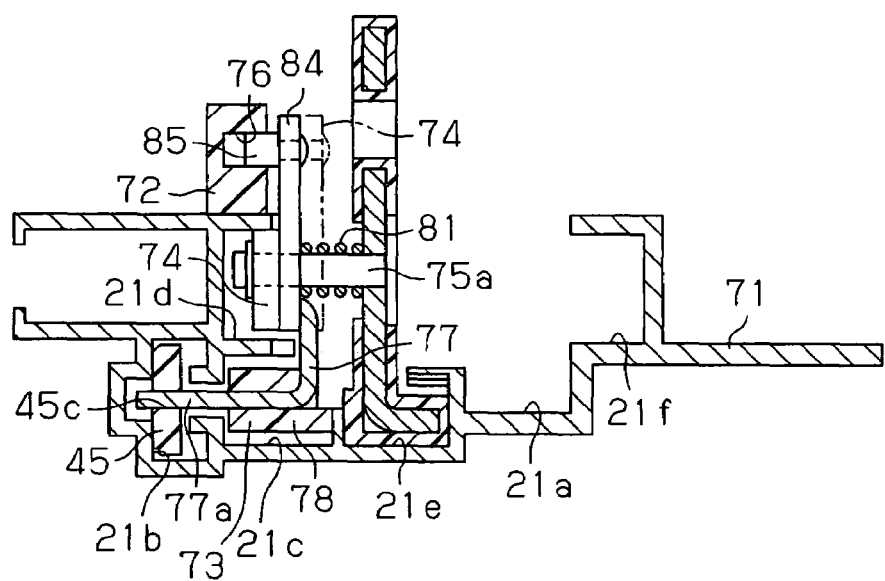
FIG. 9 is a schematic view showing the cross-section of the rear mechanism in the second embodiment.

The guide rail 71 accommodates the rear mechanism 70. As shown in FIG. 9, the guide rail 71 has the same cross section as the guide rail 21 of the first embodiment. The upper wall of a second guide 21d of this guide rail 71 has a notch 71a, which is formed in the vicinity of the raising and lowering link 34 (refer to FIG. 7(a)).

The guide block 72 is made of resin, and is placed on the upper wall of the second guide 21d in a manner to close part of the notch 71a. The left side surface of the guide block 72 is positioned in front of the right end of the second guide 21d (refer to FIG. 9). A guide groove 76 is formed on the right side surface of the guide block 72 (the inner surface of the vehicle). As shown in FIG. 7(c), the guide groove 76 extends in the longitudinal direction of the guide rail 71 and is formed to open toward the front side of the guide block 72. The rear part of the guide groove 76 extends diagonally upward. A lock recession 76a, which extends to the left side of the guide block 72, is formed in the rear end of the guide groove 76.

The rear shoe 73 is supported on the guide rail 71 in a slidable manner. As shown in FIG. 7(c) and FIG. 9, the rear shoe 73 includes a frame 77, which forms the frame of the rear shoe 73, a guide shoe 78, which is made of resin and in which the frame 77 is embedded, and an engagement portion 79. The engagement portion 79 is arranged at the rear side of the rear shoe 73.

As shown in FIG. 9, the rear shoe 73 is supported on a first guide 21c by the guide shoe 78. The frame 77 has a plurality of mounting pieces 77a, which are inserted in mounting holes 45c of a drive belt 45. The rear shoe 73 is connected to the drive belt 45 by inserting the mounting pieces 77a in the mounting holes 45c. Thus, the rear shoe 73 moves on the first guide 21c in cooperation with the movement of the drive belt 45.

Figure 8A:
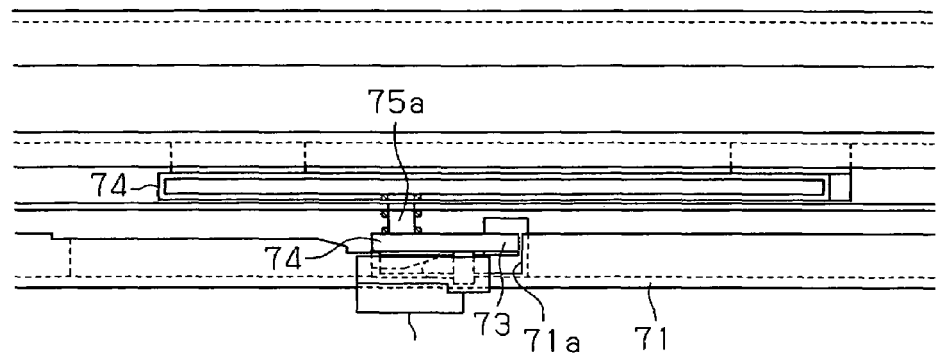
FIG. 8(a) is a plan view showing the rear mechanism according to the second embodiment.
Figure 8B:
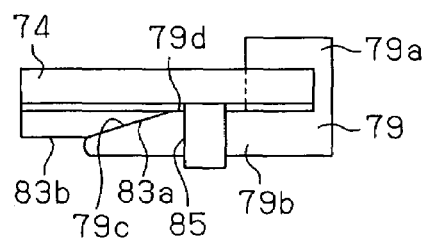
FIG. 8(b) is a plan view showing the engagement portion and the lock portion.
Figure 8C:
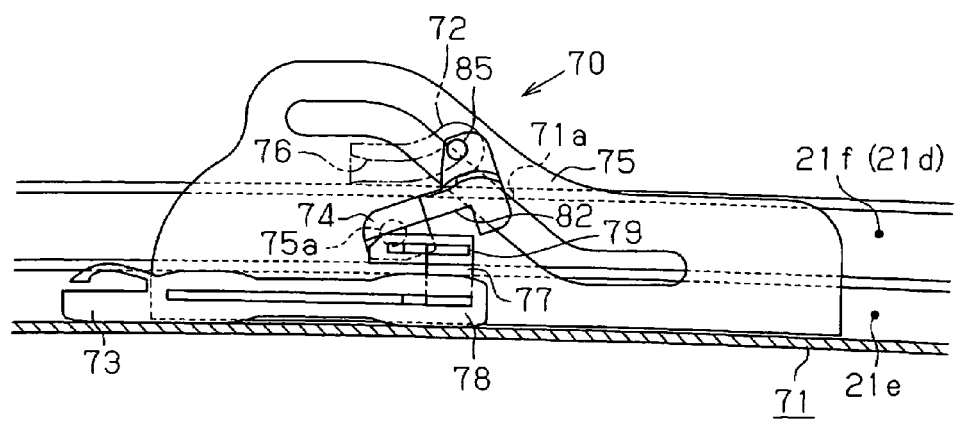
FIG. 8(c) is a side view showing the rear mechanism.

As shown in FIGS. 8(b) and 8(c), the engagement portion 79 is arranged on the upper end portion of the frame 77 that projects upward from the rear end portion of the guide shoe 78. The distal portion of the frame 77 extends above an opening that is formed in the right upper portion of the first guide 21c (refer to FIG. 9) and extends along the lower wall of the second guide 21d. A predetermined gap is formed between the engagement portion 79, which extends along the lower wall of the second guide 21c, and the upper wall of the second guide 21d.

As shown in FIG. 7(b), a planar lock portion 79a, which serves as a shoe side engagement portion, is arranged on the basal part of the engagement portion 79. A guide wall 79b, which extends to the front side of the vehicle, is arranged on the distal portion of the engagement portion 79. An interface between the lock portion 79a and the guide wall 79b is located at a middle position of the second guide 21d in the widthwise direction. A guide surface 79c, which is inclined in a manner so that it is closer to the right side of the vehicle (the opening side of the second guide 21d) toward the rear side, is arranged at the right distal portion of the guide wall 79b, which extends to the front side. A flat surface 79d, which is parallel to the left edge of the guide wall 79b, is formed at the rear side of the guide surface 79c.

As shown in FIG. 7(c) and FIG. 9, the check block 74 is pivotally supported on the raising and lowering guide 75 by a pin 75a. The pin 75a projects from the side surface of the raising and lowering guide 75 to the left side (the side of the second guide 21d), and its distal portion pivotally supports the check block 74. The check block 74 extends from the pin 75a to the rear side of the vehicle along the second guide 21d. The check block 74 is supported on the second guide 21d. As shown in FIG. 9, the check block 74 is urged to the left side (the inside of the vehicle) by a spring 81, which is set on the pin 75a. A lock groove 82, which is formed to be recessed upward, is formed in the lower surface of the check block 74 as shown in FIG. 7(c). The lock portion 79a of the rear shoe 73 is locked with the lock groove 82, which serves as a first engagement portion.

As shown in FIG. 7(b), the check block 74 includes a guide wall 83 at a position closer to its front side than the lock groove 82 (the side of its rotation axis). The guide wall 83 is formed to project from the left side surface of the check block 74 to the left side, and extend along the lower wall of the second guide 21d. A guide surface 83a, which is inclined in a manner that it is closer to the right side of the vehicle (the opening side of the second guide 21d) at locations toward the rear, is arranged at the rear side of the guide wall 83 (the side of the lock groove 82). A flat surface 83b, which is parallel to the side surface of the check block 74, is formed at the front side of the guide surface 83a.

As shown in FIG. 7(c) and FIG. 9, an extension 84, which extends upward from the opening of the second guide 21d, is arranged on the distal portion of the check block 74 (the rear side of the vehicle). An engagement pin 85, which projects to the left side, is arranged on the side surface of the extension 84. The engagement pin 85, which serves as a second engagement portion, is arranged to have a height equal to the height of the opening of the guide groove 76.

As shown in FIGS. 7(a) to 7(c), when the check block 74 is arranged in the second guide 21d and the lock portion 79a of the rear shoe 73 is engaged with the lock groove 82, the rear shoe 73 and the check block 74 are arranged parallel to each other in the widthwise direction while the opposing flat surfaces 79d and 83b are in contact with each other. In this state, the right part of the rear shoe 73 and the left part of the check block 74 are spaced in the widthwise direction by a predetermined width with their flat surfaces 79d and 83b being in contact with each other. Accordingly, the check block 74, of which movement in the heightwise direction is restricted by the top wall and the bottom wall of the second guide 21d, is not pivoted.

In the states shown in FIGS. 7(a) to 7(c), when the rear shoe 73 is moved to the rear side, the check block 74 moves to the rear side along the second guide 21d together with the raising and lowering guide 75. In this state, the check block 74 and the rear shoe 73 remain engaged.

As shown in FIGS. 8(a) to 8(c), when the rear shoe 73 is moved to the rear side, the engagement pin 85 is inserted in the guide groove 76 of the guide block 72. In this state, the guide groove 76 guides the engagement pin 85 upward so that the rear part of the check block 74 pivots upward. The distal portion of the check block 74 (the rear side) reaches the side of the notch 71a in this state. Thus, the top wall of the second guide 21d does not restrict rotation of the check block 74.

Subsequently, when the engagement pin 85 reaches the lock recession 76a of the guide groove 76, the check block 74 pivots until the disengaged state of the lock portion 79a and the lock groove 82 is canceled. In this state, the check block 74 is urged to the left side (the side of the second guide 21d) by the spring 81. Thus, the check block 74 moves towards the notch 71a located at the left side. Along with this, the guide surface 83a and the guide surface 79c come in contact with each other. As a result, the engagement pin 85 is inserted gradually into the lock recession 76a. This causes the check block 74 to be locked at the guide block 72 via the lock recession 76a, and further causes the check block 74 to be locked securely at the guide block 72 by the urging force of the spring 81. As a result, the check block 74 maintains the state separated from the rear shoe 73 (disengaged state of the check block 74 and the rear shoe 73). Afterwards, the rear shoe 73 is separated from the check block 74 and moves solely to the rear side. As a result, the check block 74 stops moving in the vicinity of the notch 71a together with the raising and lowering guide 75. Further, the engagement pin 85 is inserted in the lock recession 76a so that the guide surface 83a of the check block 74 is arranged to oppose the guide surface 79c of the rear shoe 73.

When the rear shoe 73 that has been moved to the rear side moves to the front, the guide surface 83a of the check block 74 is pressed against the guide surface 79c and is gradually moved to the right side (the opening side of the second guide 21d) against the urging force applied by the spring 81. This removes the engagement pin 85 from the lock recession 76a. The engagement pin 85 is guided downward along the guide groove 76. This gradually pivots the rear part of the check block 74 downward. Subsequently, when the engagement pin 85 is removed from the front opening of the guide groove 76, the check block 74 is separated from the guide block 72. This pivots the rear part of the check block 74 further downward. As a result, the lock groove 82 and the lock portion 79a are engaged with each other, and the check block 74 is locked with the rear shoe 73 (an engaged state of the check block 74 and the rear shoe 73).

Here, in the disengaged state of the check block 74 and the rear shoe 73 shown in FIGS. 8(a) to 8(c), external force when, for example, pressing the raising and lowering guide 75 to the front side (causing the lock portion 79a and the lock groove 82 to be engaged) is assumed to be applied. In this case, the outer surface of the engagement pin 85 and the inner surface of the lock recession 76a are in contact with each other. Thus, the check block 74 does not pivot. This maintains the disengaged state of the check block 74 and the rear shoe 73. The rear part of the functional bracket 24 moves as the rear shoe 73 moves in the same manner as in the first embodiment.

The present embodiment has the advantages described below.

(A) The check block 74 moves in a direction differing from the direction in which the check block 74 pivots with respect to the raising and lowering guide 75 (the width direction of the vehicle) so that the rotation of the check block 74 is restricted. Thus, even if an external force for pivoting the check block 74 is applied from the guide rail 71 in this state, the external force fails to directly pivot the check block 74 because the check block 74 is urged in the widthwise direction of the vehicle by the spring 81. More specifically, to cause the check block 74 to shift from the above engaged state to the disengaged state, external forces in the above two different directions need to be applied to the check block 74 at the same time. However, the possibility of such plural external forces being applied to the check block 74 in an unexpected manner is low. As a result, the check block 74 enables the functional bracket 24 to be held at a stable position, and enables the movable panel 13 to be held at a stable position.

(B) The guide groove 76 guides the engagement pin 85 to pivot the check block 74. Further, the engagement pin 85 is inserted in the lock recession 76a by the urging force of the spring 81 so that the check block 74 and the rear shoe 73 are set in the disengaged state. The above disengaged state is maintained by fitting the engagement pin 85 into the lock recession 76a using the urging force of the spring 81. Thus, even when an external force for canceling the disengaged state is applied from the guide rail 71, an unexpected shift between the engaged state and the disengaged state is not likely to occur. The disengaged state of the check block 74 and the rear shoe 73 is maintained in a stable manner. As a result, the check block 74 enables the functional bracket 24 to be held at a stable position. In other words, the check block 74 enables the movable panel 13 to be held at a stable position.

(C) The guide surfaces 79c and 83a that slide and move relative to each other are arranged between the rear shoe 73 and the check block 74 to gradually insert the engagement pin 85 in the lock recession 76a. In this case, the shift from the engaged state to the disengaged state advances gradually. This easily avoids noise generation. The same applies to the shift from the disengaged state to the engaged state.

The above embodiments may be modified in the following forms.

A specific member for forming the rear shoes 30 and 73 may be formed by combining a plurality of members.

The present invention may be applied to a sunroof device for moving the front part of the functional bracket 24 upward and downward.

The sunroof device 11 may include a plurality of movable panels.

The invention claimed is:

1. A sunroof device for use with a vehicle having a roof opening, the sunroof device comprising:
    a movable panel for closing the roof opening of the vehicle;
    a functional bracket for supporting the movable panel;
    a guide rail arrangable in the roof opening, wherein the guide rail extends from a front side to a rear side of the vehicle;
    a shoe for moving along the guide rail;
    a check member engageable with the shoe, wherein the check member and the shoe are set in one of an engaged state and a disengaged state, the check member moving integrally with the shoe as the shoe moves in the engaged state, the check member and the shoe being separated from each other and the check member being engaged with the guide rail in the disengaged state;
    a raising and lowering member for pivotally supporting the check member, wherein the raising and lowering member moves the functional bracket upward or downward in cooperation with movement of the check member in the engaged state; and
    an urging member for applying an urging force to the check member, wherein the urging member turns over the check member with the urging force and the check member is set in the disengaged state.

2. The sunroof device according to claim 1, wherein:
    the shoe includes a shoe side engagement portion;
    the check member includes a first check block, pivotally supported by the raising and lowering member, and a second check block, pivotally supported by the first check block and having a check side engagement portion;
    in the engaged state, pivoting of the check member is restricted by the guide rail, and the shoe side engagement portion and the check side engagement portion are engaged with each other; and
    in the disengaged state, pivoting of the second check block is permitted, and the shoe side engagement portion presses the check side engagement portion and swings the first check block as the shoe moves so that the second check block is rotated and locked to the guide rail.

3. The sunroof device according to claim 2, wherein the urging member is arranged between the guide rail and the first check block and presses a pivoting axis of the second check block toward the guide rail so that the second check block is locked to the guide rail.

4. A sunroof device for use with a vehicle having a roof opening, the sunroof device comprising:
    a movable panel for closing the roof opening of the vehicle;
    a functional bracket for supporting the movable panel;
    a guide rail arrangable in the roof opening, wherein the guide rail extends from a front side to a rear side of the vehicle;
    a shoe for moving along the guide rail;
    a check member engageable with the shoe, wherein the check member and the shoe are set in one of an engaged state and a disengaged state, the check member moving integrally with the shoe as the shoe moves in the engaged state, the check member and the shoe being separated from each other and the check member being engaged with the guide rail in the disengaged state;
    a raising and lowering member for pivotally supporting the check member, wherein the raising and lowering member moves the functional bracket upward or downward in cooperation with movement of the check member in the engaged state, and the check member moves in a direction differing from a direction in which the check member pivots relative to the raising and lowering member so that the check member is set in the disengaged state.

5. The sunroof device according to claim 4, further comprising:

a guide block fixed to the guide rail, wherein the guide block includes a guide groove extending along the guide rail, with the guide groove including an end portion having a lock recession; and an urging member for applying an urging force to the check member, wherein the urging member urges the check member toward the guide groove with the urging force;

wherein the shoe has a shoe side engagement portion;

the check member includes a first engagement portion and a second engagement portion;

in the engaged state, pivoting of the check member is restricted by the guide rail, and the shoe side engagement portion and the first engagement portion are engaged with each other; and in the disengaged state, pivoting of the check member is permitted, and the second engagement portion is guided by the guide groove as the shoe moves so that the check member is pivoted, and the urging force of the urging member inserts the second engagement portion in the lock recession.

6. The sunroof device according to claim 5, wherein:

the shoe and the check member each have a guide surface, and the guide surfaces slide as the shoe and the check member move relative to each other and gradually inserts the second engagement portion in the lock recession.

* * * * *